United States Patent
Chong et al.

(10) Patent No.: US 6,366,908 B1
(45) Date of Patent: Apr. 2, 2002

(54) KEYFACT-BASED TEXT RETRIEVAL SYSTEM, KEYFACT-BASED TEXT INDEX METHOD, AND RETRIEVAL METHOD

(75) Inventors: Kyung Taek Chong; Myung-Gil Jang; MiSeon Jun; Se Young Park, all of Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/475,743

(22) Filed: Dec. 30, 1999

(30) Foreign Application Priority Data

Jun. 28, 1999 (KR) ............................................ 99-25035

(51) Int. Cl.[7] ............................................. G06F 17/30
(52) U.S. Cl. ................... 707/3; 707/5; 707/6; 707/101; 707/201; 704/7; 704/9; 704/10; 382/177; 382/306
(58) Field of Search ................................ 707/1, 2, 3, 4, 707/5, 6, 102, 103, 104.1; 706/12, 45, 47; 704/7, 9, 10, 270.1

(56) References Cited

U.S. PATENT DOCUMENTS

| | | | |
|---|---|---|---|
| 4,839,853 A | | 6/1989 | Deerwester et al. ......... 364/900 |
| 5,289,375 A | * | 2/1994 | Fukumochi et al. ... 364/419.02 |
| 5,535,382 A | | 7/1996 | Ogawa ....................... 395/600 |
| 5,541,836 A | * | 7/1996 | Church et al. ........... 364/419.07 |
| 5,598,557 A | * | 1/1997 | Doner et al. ................. 395/605 |
| 5,708,829 A | | 1/1998 | Kadashevich et al. ...... 395/793 |
| 5,721,902 A | * | 2/1998 | Schultz ....................... 395/604 |
| 5,771,378 A | * | 6/1998 | Holt et al. ................... 395/605 |

OTHER PUBLICATIONS

Jang, Ho Wook and Se Young Park, "Keyfact Concept For An Information Retrieval System," Proceedings of Natural Language Proc. Pacific Rim Symposium, pp. 510–513, 1995.

Jun, MiSeon and Se Young Park, "Keyfact–Based Information Retrieval System," International Symposium on Digital Library, pp. 521–524, 1997.

Arampatzis et al., "Phrase–Based Information Retrieval," *Journal of Information Proc. & Management* 34(6):1–19, 1998.

Robert Krovetz and W. Bruce Croft:"Lexical ambiguity and information retrieval", Apr. 1992, ACM, vol. 10, pp. 115–141.*

Michael Sussna: "Word sense disambiguation for free–text indexing using a massive semantic network", 1993, ACM, pp. 67–74.*

* cited by examiner

*Primary Examiner*—Thomas Black
*Assistant Examiner*—Jacques Veillard
(74) *Attorney, Agent, or Firm*—E. Russell Tarleton; SEED IP Law Group PLLC (57) ABSTRACT

A keyfact-based text retrieval method and a keyfact-based text index method that describes the formalized concept of a document by a pair comprising an object that is the head and a property that is the modifier and uses the information described by the pairs as index information for efficient document retrieval. A keyfact-based text retrieval system includes keyfact extracting, keyfact indexing, and keyfact retrieving. The keyfact extracting analyzes a document collection and a query and extracts keywords and keyfacts. The keywords do not have part-of-speech ambiguity and the keyfacts are extracted from the keywords. The keyfact indexing calculates the frequency of the keyfacts and generates a keyfact list of the document collection for a keyfact index structure. The keyfact retrieving receive a keyfact of the query and keyfacts of the document collection and defines a keyfact-based retrieval model in consideration of a weight factor of the keyfact pattern and generates a retrieval result. The retrieval result is a document similar to the query.

12 Claims, 5 Drawing Sheets

KEYFACT-BASED TEXT RETRIEVAL SYSTEM, KEYFACT-BASED TEXT INDEX METHOD, AND RETRIEVAL METHOD

TECHNICAL FIELD

The present invention relates to a keyfact-based text retrieval method and a keyfact-based text index method. In particular, the methods describe the formalized concept of a document as a pair comprising an object that is the head and a property that is the modifier, and uses the information described by the pair as index information for efficient document retrieval.

BACKGROUND OF THE INVENTION

A keyfact means an important fact contained in sentences which constitute a document. The keyfact is represented by an object and property information through syntactic analysis of the sentence.

The keyword-based text retrieval method was the main stream in conventional text retrieval methods. However, the precision of the keyword-based text retrieval method was not good due to the following reasons. First, the meaning of the document is not precisely represented and the representativeness of document expression is low because the document is represented by keywords, which are nouns. This is a fundamental reason for poor retrieval precision. Second, when a query includes a natural language phrase or a natural language sentence or keywords, the intention of the user's query is not reflected precisely in a keyword-based text retrieval method because the query is expressed by keywords. Therefore, the keyword-based text retrieval method has a fundamental limitation in retrieval precision because it performs document retrieval by keywords. As a result, because the keyword-based text retrieval system provides such low level of retrieval precision, it causes a number of unnecessary retrievals and therefore precious resources, such as time and effort, are wasted.

Recently, a number of studies have been performed in the area of phrase-based text retrieval methods in order to compromise such defects of the keyword-based retrieval method. The phrase-based text retrieval methods extract a precise phrase pattern through a morphological-syntactic normalization process and perform indexing and retrieval by extracted phrase. Therefore, the phrase-based retrieval method performs more precise text retrieval than the keyword-based text retrieval method but performs less precise text retrieval than a concept-based text retrieval method, which expresses text by concept units.

A new approach to keyfact-based text retrieval methods has been proposed in order to overcome the shortcomings of the keyword-based text retrieval method and generalize phrase-based text retrieval method. In the keyfact-base text retrieval method, a part of text that represent the same meaning is described as a keyfact. Since the keyfact-based retrieval method is a sort of concept-based retrieval method, and therefore indexing and retrieval of the keyfact-based retrieval method are performed with the unit of the keyfact, precision of the retrieval is greatly improved.

In the keyfact-based retrieval method, it is desirable that phrases or words having the same meaning are indexed as the same indexing terms. For example, noun phrases including "the retrieval of information" as a subset of "the efficient retrieval of information", "the retrieval of the distributed information", and "the fast retrieval of the distributed information" must have common indices which can be possibly generated from "the retrieval of information" as subsets and recognize also them as different meaning with subtle conceptual different indexes at the same time.

Since the keyword-based retrieval method doesn't recognize the conceptual difference between "the retrieval of the information" and "the efficient retrieval of the information", users are not able to retrieve the exact document that is desired.

SUMMARY OF THE INVENTION

A keyfact-based retrieval method, which extracts the precise keyfact pattern using the natural language processing techniques and indexes documents with the unit of the keyfact, is provided.

In addition, a keyfact-based retrieval method, which extracts precise keyfact patterns included in a natural query of a user using the natural language processing techniques and retrieves documents similar to the query in the keyfact-based index file, is provided.

In addition, a keyfact-based retrieval method, which retrieves and indexes documents with the unit of keyfact, is provided.

A keyfact-based text retrieval system of the present invention includes keyfact extracting means, keyfact indexing means, and keyfact retrieving means. The keyfact extracting means analyze a document collection and a user query, and extracting keywords not having part-of-speech ambiguity from the document collection and the user query, and respectively extracting keyfacts of the document collection and the user query from the keywords. The keyfact indexing means for calculating the frequency of the keyfacts of the document collection and generating a keyfact list of the document collection for a keyfact index structure. The keyfact retrieving means for receiving the keyfact of the user query and the keyfacts of the document collection and defining a keyfact retrieval model in consideration of weight factors according to a keyfact pattern and generating a retrieval result.

The keyfact extracting means includes morphology analyzing means, part-of-speech tagging means, keyfact pattern extracting means, and keyfact generating means. The morphology analyzing means analyze morphology of an input sentence and obtaining tag sequences of part-of-speech by attaching part-of-speech tags. The part-of-speech tagging means selects a tag sequence of part-of-speech out of the tag sequences of part-of-speech. The tag sequence of part-of-speech is precise. The keyfact pattern extracting means extracts a keyfact pattern by applying the tag sequences of part-of-speech to a keyfact pattern rule. The keyfact generating means applies the keyfact pattern to a keyfact pattern generation rule and generating a keyfact list, which is a set of keyfact terms.

The keyfact indexing means includes frequency calculating means, table generating means, and keyfact indexing means. The frequency calculating means calculates a frequency of various keyfacts and a document frequency of the keyfacts. The various keyfacts are included in the document collection, and the document frequency is the number of documents contained the various keyfacts. The table generating means generates a document index table, a document table, and a keyfact index table of the document collection. The keyfact indexing means forms a keyfact index structure. The keyfact index structure has information regarding document frequency, document identifier, and keyfact frequency in each corresponded documents.

The keyfact retrieving means includes following means. A means forms a document and a user query vector with an index file and the keyfact of the user query. The index file generated by the keyfact indexing means. The keyfact of the user query generated by the keyfact extracting means. A means determines keyfact weight constants in accordance with the keyfact pattern. A means calculates keyfact weights for the document and the user query by applying the keyfact weight constants to the document and the user query vector. The retrieval results displaying means displays the retrieval result by applying the keyfact weights to keyfact retrieval model. The retrieval result indicates documents with a keyfact similar to the keyfact of the user query.

A keyfact-based text retrieving method of the present invention includes keyfact extracting step, keyfact indexing step, and keyfact retrieving step. The keyfact extracting step is to analyze a document collection and a user query, and extracts keywords without part-of-speech ambiguity from the document collection and the user query, and respectively extracts keyfacts of the document collection and the user query from the keywords. The keyfact indexing step is to calculates the frequency of the keyfacts of the document collection and generates a keyfact list of the document collection for a keyfact index structure. The keyfact retrieving step is to receives the keyfact of the user query and the keyfacts of the document collection and defines a keyfact retrieval model in consideration of weigh factors according to the keyfact pattern and generates the retrieval result.

The step of keyfact extracting includes the following steps. The first step is to analyze morphology of an input sentence and obtaining tag sequences of part-of-speech by attaching part-of-speech tags. The second step is to select a tag sequence of part-of-speech out of the tag sequences of part-of-speech. The third step is to extract a keyfact pattern by applying the tag sequence of part-of-speech to a keyfact pattern rule. The fourth step is to apply the keyfact pattern to a keyfact pattern generation rule and generating a keyfact list.

The step of analyzing morphology includes the following steps. The first step is to divide the input sentence into words. The second step is to perform morphological analysis on the words using part-of-speech dictionaries. The third step is to perform morphological variation and recover prototypes. The fourth step is to obtain the tag sequence of part-of-speech by tagging part-of-speech tags in accordance with the result of the morphological analysis.

The part-of-speech dictionaries include a noun dictionary, a verb dictionary, an adjective dictionary, an adverb dictionary, a preposition dictionary, a conjunction dictionary and a stop-word lexicon.

The step of keyfact indexing includes the following steps. The first step is to calculate a frequency of various keyfacts and a document frequency of the keyfact. The second step is to generate a document index table, a document table and a keyfact index table of the document collection. The third step is to form a keyfact index structure including document frequency, document identifier and keyfact frequency.

The step of keyfact retrieving includes the following steps. The first step is to form a document and a user query vector with an index file and a keyfact of the user query. The second step is to determine keyfact weight constants in accordance with the keyfact pattern. The third step is to calculate keyfact weights for the document and the user query by applying the keyfact weight constants to the document and the user query vector. The fourth step is to display the retrieval result by applying the keyfact weights to the keyfact retrieval model. The retrieval result indicates documents with a keyfact similar to the keyfact of the user query.

DETAILED DESCRIPTION OF THE INVENTION

Figure 1:
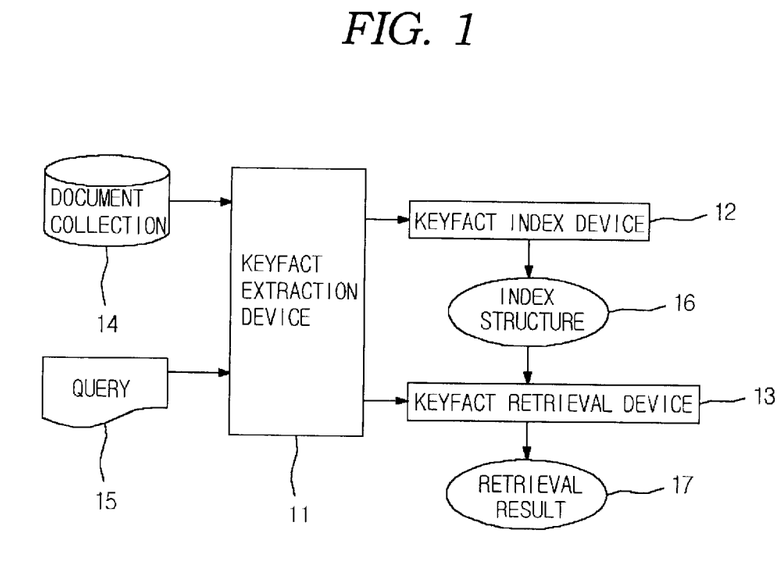
FIG. 1 is a block diagram illustrating a keyfact-based text retrieval system of the present invention.
Figure 2:
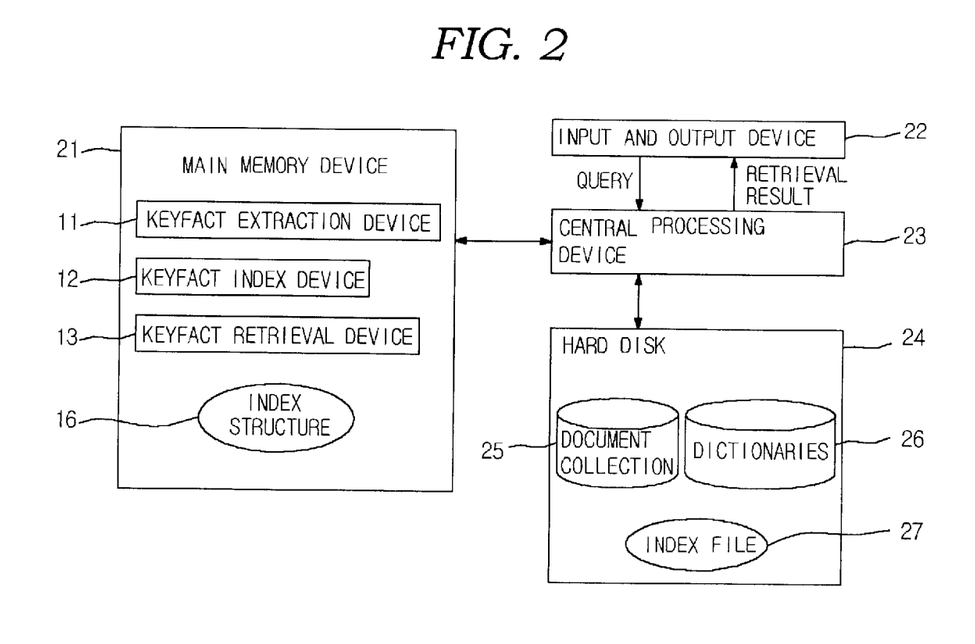
FIG. 2 is a block diagram illustrating a hardware structure of a keyfact-based text retrieval system in accordance with an embodiment of the present invention.

FIG. 1 is a block diagram illustrating a keyfact-based text retrieval system of the present invention. The keyfact-based text retrieval system comprises a keyfact extraction device 11, a keyfact index device 12, and a keyfact retrieval device 13. FIG. 2 is a block diagram illustrating a hardware structure of a keyfact-based text retrieval system in accordance with an embodiment of the present invention.

As shown in FIG. 2, the main memory device 21 includes a keyfact extraction device, a keyfact index device 12, a keyfact retrieval device 13, and an index structure 16. The central processing device 23 supervises the keyfact-based text retrieval. A hard disk 24 stores document collection 25, dictionaries for keyfact retrieval 26, and an index file that is the result of the keyfact index. The index file 27 is loaded onto the main memory as an index structure 16 and the keyfact retrieval device 13 uses the index file. The input and output device 22 receives a query from a user and generates retrieval results to the user.

Now, the keyfact-based text retrieval system in accordance with the present invention is explained with reference to FIG. 1. Once a document collection 14 or a query 15 is given, the keyfact extraction device 11 extracts words without ambiguity by performing morphological analysis and tagging. The keyfact generation rule is applied to the words and then the keyfacts are extracted.

The keyfact index device 12 indexes the document collection 14 or the query with the unit of keyfact and calculates the frequencies of the keyfacts. The frequencies of the keyfacts are stored into the index structure 16 with the document ID information. The keyfact retrieval device 13 orders documents using the similarity calculation method and shows retrieval results. The similarity calculation method considers document collection and keyfact weights with the help of a keyfact-based text retrieval model. In a keyfact-based text retrieval, when a document collection 14 or a query is given, the keyfact extraction device 11 expresses it in the unit of keyfacts. All keyfacts express semantic relation between words in the form of [object, property]. Keyfacts can be categorized by configurations of an object and a property. Parts of text that express the same conceptual meaning in the document collection or the query are categorized into the same keyfact type. The keyfact extraction device will be reviewed in detail below with FIG. 3.

The keyfact index device 12 indexes the extracted keyfacts with frequency information. In other words, the keyfact index device 12 calculates frequencies of the various forms of keyfacts included in the documents and generates a keyfact list of the document collection. Therefore, an index structure 16 that reflects keyfacts is created and the index file is stored. The keyfact index device 12 will be reviewed in detail below with FIG. 4.

When the keyfact retrieval device 13 receives a query, it retrieves appropriate documents on the basis of the keyfact-based retrieval method. The keyfact retrieval model is defined by considering weights of keyfact patterns. The similarity between the query and the documents is calculated and appropriate documents for the query are shown as a result in the order of the similarity. The keyfact retrieval device 13 will be reviewed in detail below with FIG. 5.

Figure 3:
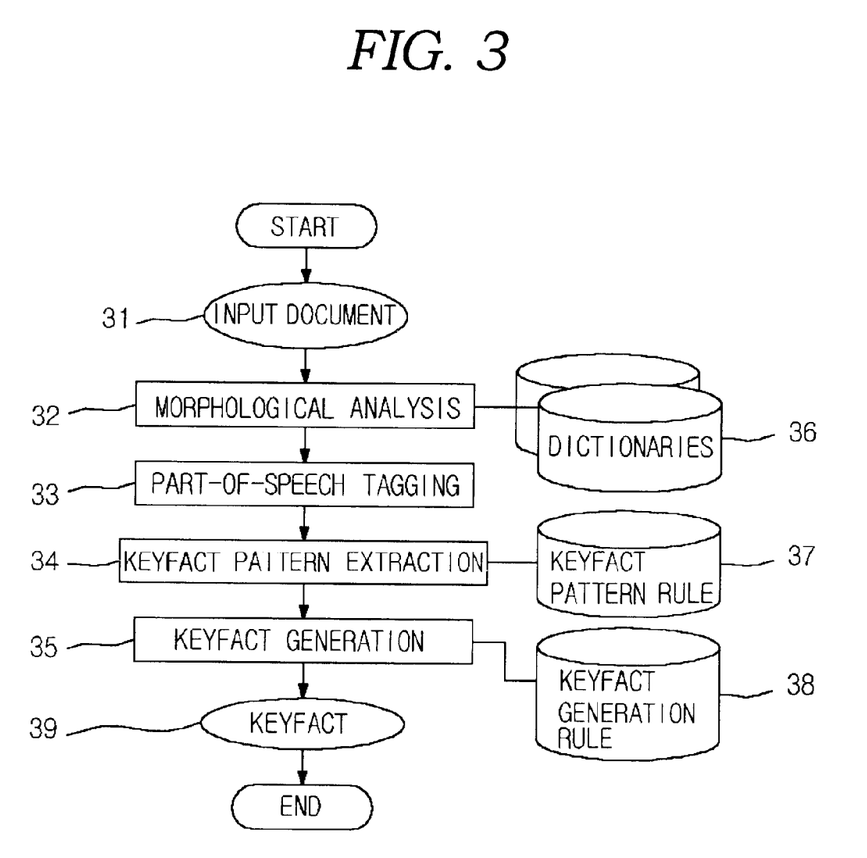
FIG. 3 is a block diagram illustrating a keyfact extraction device of a keyfact-based text retrieval system in accordance with an embodiment of the present invention.

As shown in FIG. 3, the keyfact extraction device 11 analyzes a document and generates keyfacts through the processes of morphological analysis, part-of-speech tagging, keyfact pattern extraction, and keyfact generation.

A document is supplied at stage 31 and morphological analysis is performed at stage 32. A sentence in the document is divided into words and the morphological analysis is performed with dictionaries 36 at stage 32. The morphological variation is considered in order to recover prototypes. The dictionaries 36 include a noun dictionary, a verb dictionary, an adjective dictionary, an adverb dictionary, a preposition dictionary, a conjunction dictionary, and a stop-word lexicon. In some cases, a part-of-speech of a word is determined by rules without dictionaries.

The part-of-speech tag in dictionaries 36 includes noun (N), verb (V), adjective (A), preposition (P), and stop-word (S). The noun is further divided into proper noun (NQ), name noun (NN), vocative noun (NV), unit nouns (NJ), predicate noun (NU), non-predicate noun (NX), etc. The reason for such division is that the class of noun determines the object or the property of the keyfacts.

For example, in a sequence of words having two or three nouns in a row, it is likely that name noun (NN), proper noun (NQ), and non-predicate noun (NX) are objects and vocative noun (NV), unit noun Id), and predicate noun (NU) are properties. Additionally, in a phrase having proper noun (NQ), name noun (NN), and non-predicate noun (NX), the order of priority of nouns in the object is name noun (NN)>proper noun (NQ)>non-predicate noun (NX).

The preposition is divided into the possessive preposition (PO) which is used as "of" and the positional preposition (PP) and etc. The adjective or the variated verb which makes up the noun is tagged as a pronoun (MP), which is a separate keyfact tag. For example, in analyzing "the fast retrieval of the distributed information" with morphological analysis, a result of the sequence of the tag would be "S (stop-word) A (adjective) NV (vocative noun) PO (possessive preposition) S (stop-word) V-ed (verb) NV (vocative noun). The V-ed (verb) is a modified form of verb and makes up the noun. Like the A (adjective), the V-ed (verb) is converted into a keyfact tag MP and the sequence of nouns is converted into a keyfact tag KEY. The final result would become "NMP KEY PO MP KEY".

Once the stage 32 of morphological analysis is performed, various results are obtained.

At stage of 33 in which part-of-speech tagging is performed, a precise sequence of tags is chosen among the various results of the morphological analysis. In other words, the part-of-speech tags obtained from the morphological analysis are used at the stage of part-of-speech tagging. The modified form of verb that makes up a noun or an adjective is converted into a modifier (MP) and the sequence of nouns is converted into KEY tag. The exemplary sentence "the fast retrieval of the distributed information" shows the final sequence of tags "MP KEY PO MP KEY".

Once the final sequence of tags in response to the input sentence is obtained, the stage of keyfact pattern extraction 34 searches the keyfact pattern rule 37 and extracts meaningful keyfact patterns necessary for keyfact generation. The keyfact pattern rule 37 which is used for keyfact pattern extraction describes keyfact patterns as to the sequence of the input tags. A part of the keyfact pattern rule is illustrated at following table 1.

TABLE 1

| Keyfact pattern | Keyfact term list |
| --- | --- |
| KEY1 PO KEY2 | [KEY2, KEY1], [KEY1, NIL], |
| (the retrieval of information) | [KEY2, NIL], |
|  | [KEY2 KEY1, NIL] |
|  | [information, retrieval], |
|  | [information, NIL], |
|  | [retrieval, NIL], |
|  | [information retrieval, NIL] |
| KEY1 PO MP KEY2 | [KEY2, KEY1], [KEY1, NIL], |
| (the retrieval of the | [KEY2, NIL], |
| distributed information) | [KEY2 KEY1, NIL], [KEY2, MP] |
| MP KEY1 PO KEY2 | [KEY2, KEY1], [KEY1, NIL], |
| (the fast retrieval of | [KEY2, NIL], |
| information) | [KEY2 KEY1, NIL], [KEY1, MP] |
| MP1 KEY1 PO MP2 KEY2 | [KEY2, KEY1], [KEY1, NIL], |
| (the fast retrieval of the | [KEY2, NIL], |
| distributed information) | [KEY2 KEY1, NIL], [KEY1, MP1], |
|  | [KEY2, MP2] |

(Note:
The italic is the examples.)

The final sequence of tags "MP KEY PO MP KEY" obtained from "the fast retrieval of the distributed information" is applied to the keyfact pattern rule and the keyfact pattern "MP1 KEY1 PO MP2 KEY2" is the result.

Keyfact terms that have forms of [object, property] are generated as to the input keyfact pattern at the stage of the keyfact generation 35 by searching the keyfact generation rule 38. The object is a noun or a compound noun represented by a keyword and the property is a verbal word or a noun that makes up another noun, or a prototype of a verbal word.

The keyfact generation rule includes possible keyfact lists, each of which can be generated in each keyfact pattern. In the example stated above, if the keyfact pattern "MP1 KEY1 JY MP2 KEY2" is applied to the keyfact generation stage, "[KEY2, KEY1], [KEY1, NIL], [KEY2, NIL], [KEY2 KEY1, NIL], [KEY1, MP1], [KEY2, MP2]" is going to be the outcome. That is, a keyfact list 39 "[information, retrieval], [retrieval, NIL], [information, NIL], [information retrieval, NIL], [retrieval, fast], [information, distributed]" is obtained from the keyfact pattern "the fast retrieval of the distributed information".

Figure 4:
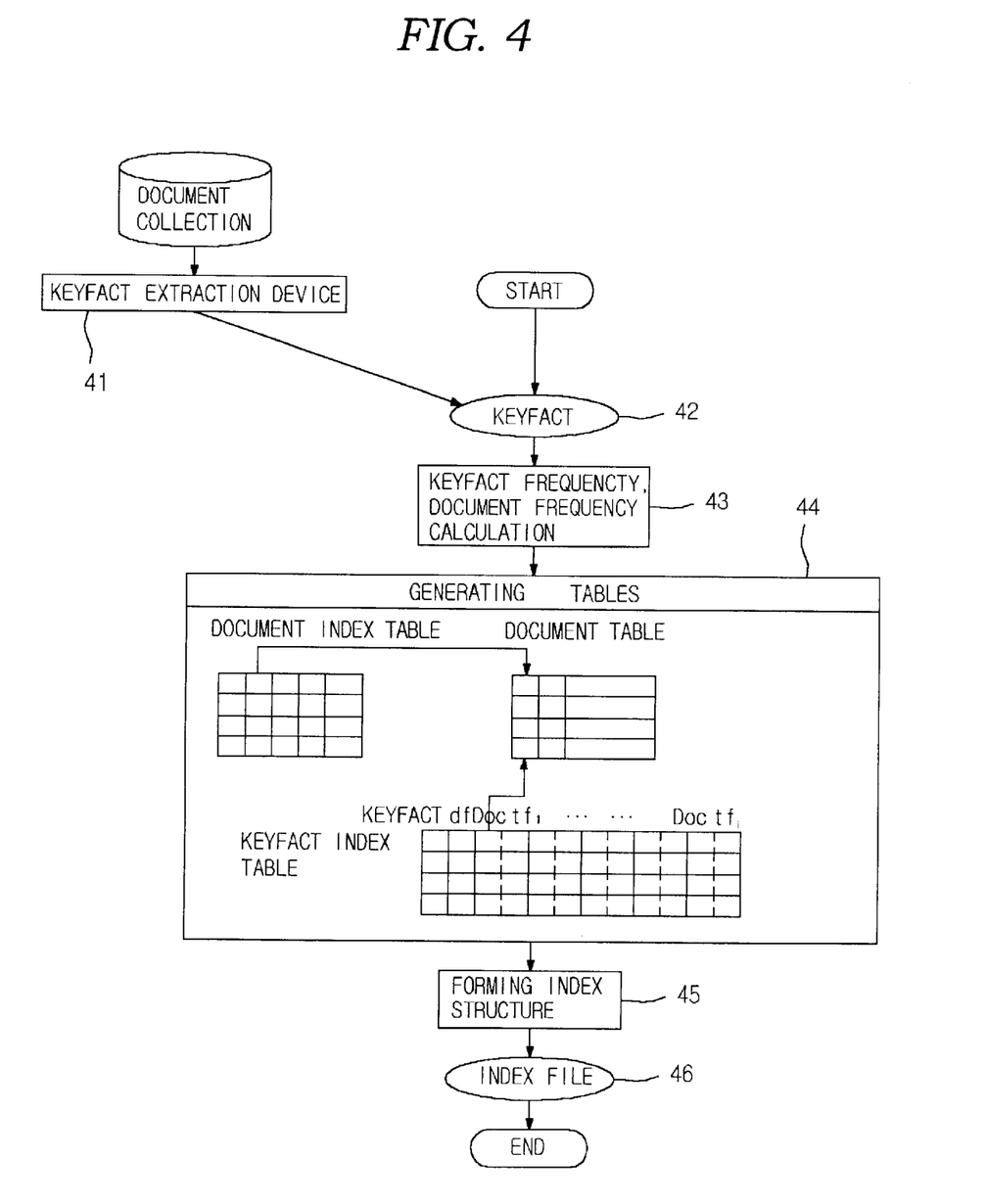
FIG. 4 is a block diagram illustrating a keyfact index device of a keyfact-based text retrieval system in accordance with an embodiment of the present invention.

The keyfact index device is now reviewed in detail with FIG. 4.

The keyfact index device calculates statistical frequencies of keyfacts in a document obtained from the keyfact extraction device 11 and forms the index structure. Therefore, index information is efficiently maintained and processed by the keyfact index device. Each index term of the keyfact index device is an extracted keyfact term representing each document.

For each document, the keyfact frequency (tf) and document frequency of the keyfact (df) are calculated in order to obtain the frequency information of the keyfacts.

Next, supplementary tables such as a document index table, a document table, and a keyfact index table are generated to form an efficient index structure 44. The document index table contains keyfacts of the document, the frequency information. The document table includes a real document text. The keyfact index table is the main table that includes the document frequency (df) of each keyfact, and pair list of the document identifier of each keyfact and the frequency information within a document (tf).

Next, an index structure is formed in the unit of the keyfact and an index file is stored. Efficient storage structures like the B+ tree can be used for the index structure. The inverted file structure of the keyfact index table is used as posting information file structure.

A part of the result of the keyfact index is shown in the following table 2.

TABLE 2

| Keyfact index | Df | Document id: frequency |
|---|---|---|
| [thorn, sharp] | 2 | (162:1)(197:1) |
| [thorn, dull] | 3 | (102:2)(188:3)(193:1) |
| ... | | |
| [reed, NIL] | 2 | (6:2)(29:1) |
| [reed field, NIL] | 1 | (6:1) |
| [branch, NIL] | 4 | (21:1)(33:2)(88:1)(90:3) |
| [Dahurian buckhorn family, NIL] | 1 | (102:1) |

At table 2, in case of [branch, NIL], "branch" appears at 4 documents and therefore the document frequency (df) for keyfact index [branch, NIL] is four. In addition, "branch" appears once in document 21, twice in document 33, once in document 88, and three times in document 90.

Figure 5:
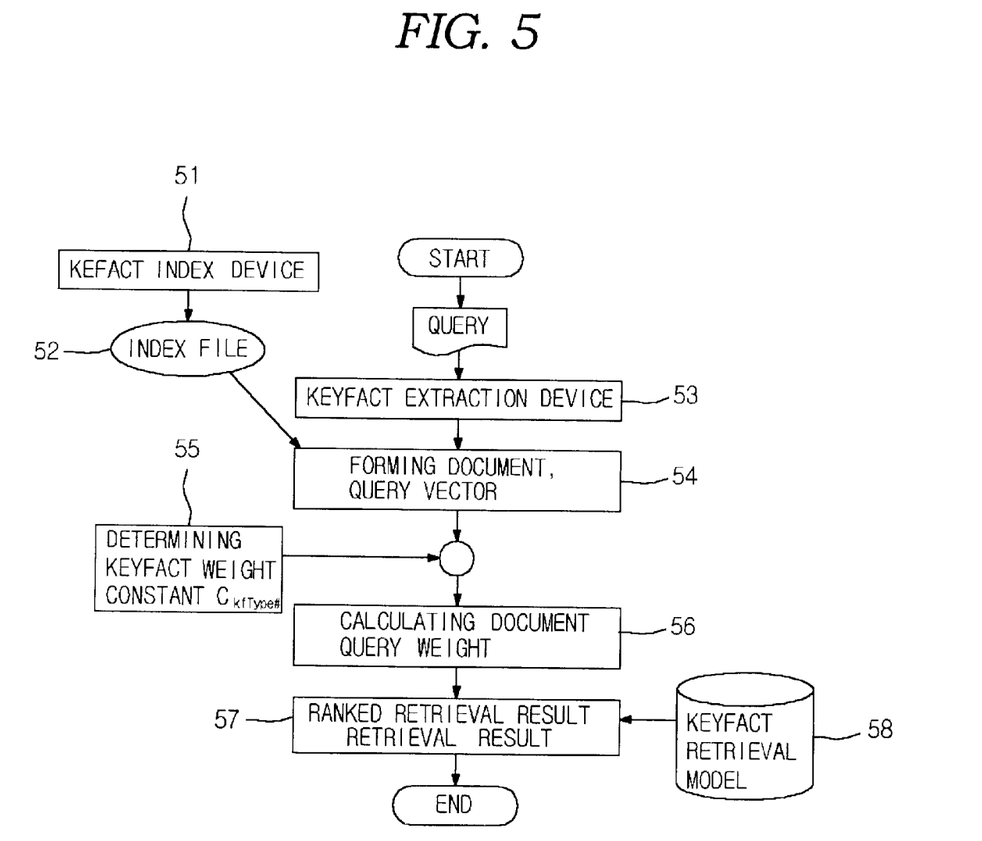
FIG. 5 is a block diagram illustrating a keyfact retrieval device of a keyfact-based text retrieval system in accordance with an embodiment of the present invention.

The keyfact retrieval device 13 is now reviewed in detail with FIG. 5. The keyfact retrieval device forms the document vector and query vector with the keyfact, which is supplied from the keyfact extraction device 53, and the index file 52 generated by the keyfact index device 51.

The keyfact weight constants ($C_{KfType\#}$), which are fit for the attribute of a document collection, are determined 55 before calculating the keyfact weights from document and query vector. Table 3 shows that keyfact weight constants are assigned to various patterns of keyfacts.

TABLE 3

| Types | Keyfact pattern | Weight constants |
|---|---|---|
| Type 1 | [KEY, NIL] | $C_{KfTypeI}$ |
| Type 2 | [KEY, MP] or [KEY, VH/VB] | $C_{KfTypeII}$ |
| Type 3 | [KEY1, KEY2] | $C_{KfTypeIII}$ |
| Type 4 | [KEY1 KEY2, NIL] or [KEY2 KEY 1, NIL] | $C_{KfTypeIV}$ |
| Type 5 | [KEY1 KEY2 KEY3] | $C_{KfTypeV}$ |
| ... | ... | ... |

The keyfact weight constants are assigned with the sequence like $C_{KfTypeI} < C_{KfTypeII} < C_{KfTypeIII} < C_{KfTypeIV} < C_{KfTypeV} < \ldots$ and do important role for the precision of keyfact-based text retrieval. Therefore, weight constants are determined experimentally on the basis of distribution of keyfact pattern of document collection.

The keyfact weight constant is applied to the following equation 1 and the result of equation 1, a keyfact weight ($W_{xk}$), is used in the keyfact-based text retrieval model.

$$w_{xk} = tf_{xk} \cdot \log\left(\frac{N+1}{df_k}\right) \cdot C_{KfType\#} \qquad \text{[Equation 1]}$$

$W_{xk}$: a keyfact weight
$tf_{xk}$: frequency of a keyfact
N: size of a document
$df_k$: document frequency of a keyfact
$C_{KfType\#}$: a keyfact weight constant Conventionally, only the frequency of keywords ($tf_{keyword}$), the document frequency of keywords ($df_{keyword}$), and the number of the documents in a document collection are considered in calculating the keyword weight in the keyword-based text retrieval system. However, the keyfact weight constant ($C_{KfType\#}$) of the keyfact pattern is also reflected in calculating keyfact weights in the keyfact-based retrieval system, so as to make it possible to index and retrieve in the unit of a keyfact.

Next, the similarity of the document appropriate for the query is calculated by employing the keyfact retrieval model based upon the vector space model. The result of the similarity calculation determines the order of appropriate documents 57.

Figure 6:
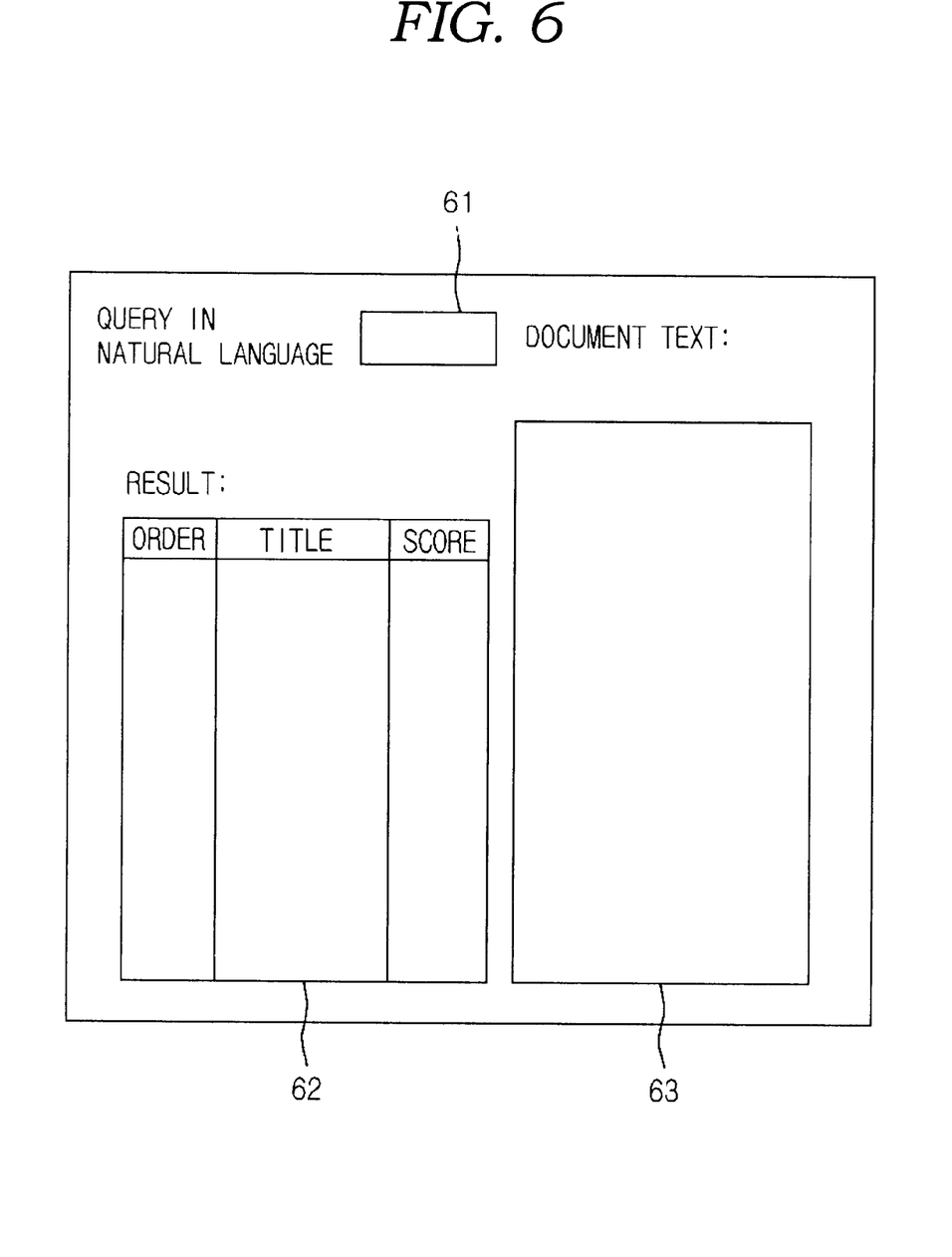
FIG. 6 is a screen image illustrating a document retrieval result in response to a query.

FIG. 6 shows a screen image for illustrating a document retrieval result in response to a query. A user makes a query in query section 61 with natural language. The keyfact is extracted by the keyfact-based text retrieval system and the documents close to the query are found. The result of the retrieval of the query is displayed at the document retrieval result screen 62 in the order of similarity. Document title and weight are also displayed with the order of similarity. In addition, if the document displayed is selected, document text screen 63 shows the contents of text of the document.

According to the present invention, texts of document collection and user queries are expressed, indexed and retrieved by concept-based keyfacts. Therefore, more precise retrieval results are achievable. Additionally, since indexing and retrieval with high precision are possible, time and efforts can be minimized, the keyfact-based retrieval method in accordance with the present invention can be used in various applications. Especially, digital library, text and annotation based multimedia information retrieval of broadcasting station, internet application, information retrieval of electronics commercial trading, and education/medical/military application areas can take advantage of the present invention.

Although representative embodiments of the present invention have been disclosed for illustrative purposes, those skilled in the art will appreciate that various modifications, additions and substitutions are possible, without departing from the scope and spirit of the invention as recited in the accompanying claims.

What we claim:

1. A keyfact-based text retrieval system comprising:
    keyfact extracting means for analyzing a document collection and a user query, and extracting keywords not having part-of-speech ambiguity from said document collection and said user query, and respectively extracting keyfacts of said document collection and said user query from said keywords;
    keyfact indexing means for calculating the frequency of said keyfacts of said document collection and generating a keyfact list of said document collection for a keyfact index structure; and
    keyfact retrieving means for receiving said keyfact of said user query and said keyfacts of said document collection and defining a keyfact retrieval model in consideration of weight factors according to a keyfact pattern and generating a retrieval result.

2. The keyfact-based text retrieval system of claim 1, wherein said keyfact extracting means comprises:

morphology analyzing means for analyzing morphology of an input sentence and obtaining tag sequences of part-of-speech by attaching part-of-speech tags;

part-of-speech tagging means for selecting a tag sequence of part-of-speech out of said tag sequences of part-of-speech, said tag sequence of part-of-speech being precise;

keyfact pattern extracting means for extracting a keyfact pattern by applying said tag sequences of part-of-speech to a keyfact pattern rule; and keyfact generating means for applying said keyfact pattern to a keyfact pattern generation rule and generating a keyfact list.

3. The keyfact-based text retrieval system of claim 1, wherein said keyfact indexing means comprises:

frequency calculating means for calculating a frequency of various keyfacts and a document frequency of said keyfacts, said various keyfacts being included in said document collection, said document frequency being the number of documents containing said various keyfacts;

table generating means for generating a document index table, a document table, and a keyfact index table of said document collection; and keyfact indexing means for forming a keyfact index structure having information regarding document frequency, document identifier, and keyfact frequency.

4. The keyfact-based text retrieval system of claim 1, wherein said keyfact retrieving means comprises:

means for forming a document and a user query vector with an index file and said keyfact of said user query, said index file generated by said keyfact indexing means, said keyfact of said user query generated by said keyfact extracting means;

means for determining keyfact weight constants in accordance with said keyfact pattern;

means for calculating keyfact weights for said document and said user query by applying said keyfact weight constants to said document and said user query vector; and results displaying means for displaying a retrieval result by applying said keyfact weights to keyfact retrieval model.

5. The keyfact-based text retrieval system of claim 4, wherein said retrieval result indicates documents with a keyfact similar to said keyfact of said user query.

6. A keyfact-based text retrieving method comprising:

keyfact extracting step for analyzing a document collection and a user query, and extracting keywords without part-of-speech ambiguity from said document collection and said user query, and respectively extracting keyfacts of said document collection and said user query from said keywords;

keyfact indexing step for calculating the frequency of said keyfacts of said document collection and generating a keyfact list of said document collection for a keyfact index structure; and keyfact retrieving step for receiving said keyfact of said user query and said keyfacts of said document collection and defining a keyfact retrieval model in consideration of weigh factors according to a keyfact pattern and generating a retrieval result.

7. The keyfact-based text retrieving method of claim 6, wherein said step of keyfact extracting comprises the steps of:

analyzing morphology of an input sentence and obtaining tag sequences of part-of-speech by attaching part-of-speech tags;

selecting a tag sequence of part-of-speech out of said tag sequences of part-of-speech;

extracting a keyfact pattern by applying said tag sequence of part-of-speech to a keyfact pattern rule; and applying said keyfact pattern to a keyfact pattern generation rule and generating a keyfact list.

8. The keyfact-based text retrieving method of claim 7, wherein said step of analyzing morphology comprises the steps of:

dividing said input sentence into words;

performing morphological analysis on said words using part-of-speech dictionaries;

performing morphological variation and recovering prototypes; and obtaining said tag sequence of part-of-speech by tagging part-of-speech tags in accordance with the result of said morphological analysis.

9. The keyfact-based text retrieving method of claim 8, wherein said part-of-speech dictionaries comprise a noun dictionary, a verb dictionary, an adjective dictionary, an adverb dictionary, a preposition dictionary, a conjunction dictionary and a stop-word lexicon.

10. The keyfact-based text retrieving method of claim 6, wherein said step of keyfact indexing comprising the steps of:

calculating a frequency of various keyfacts and a document frequency of said keyfact;

generating a document index table, a document table and a keyfact index table of said document collection; and forming a keyfact index structure including document frequency, document identifier and keyfact frequency.

11. The keyfact-based text retrieving method of claim 6, wherein said step of keyfact retrieving comprises the steps of:

forming a document and a user query vector with an index file and a keyfact of said user query;

determining keyfact weight constants in accordance with said keyfact pattern;

calculating keyfact weights for said document and said user query by applying said keyfact weight constants to said document and said user query vector; and displaying a retrieval result by applying said keyfact weights to said keyfact retrieval model.

12. The keyfact-based text retrieving method of claim 11, wherein said retrieval result indicates documents with a keyfact similar to said keyfact of said user query.

* * * * *